United States Patent
Brown et al.

(10) Patent No.: US 6,237,043 B1
(45) Date of Patent: May 22, 2001

(54) SYSTEM AND METHOD FOR ADDING HIGHLY OPTIMIZED SYNCHRONIZATION CAPABILITY TO OBJECTS AT RUN-TIME

(75) Inventors: Michael Wayne Brown, Georgetown; Michael Thomas Collins, Austin; Weiming Gu, Austin; Paul Jerome Kilpatrick, Austin; Kelvin Roderick Lawrence, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/974,751

(22) Filed: Nov. 19, 1997

(51) Int. Cl.$^7$ ........................................... G06F 9/00
(52) U.S. Cl. .............................................. 709/316
(58) Field of Search ..................... 709/300, 303, 709/1, 104, 106, 310–332; 710/200, 220, 240–244; 711/170–172

(56) References Cited

U.S. PATENT DOCUMENTS

| | | | |
|---|---|---|---|
| 5,321,841 | * 6/1994 | East et al. | 709/107 |
| 5,414,852 | * 5/1995 | Kramer et al. | 709/104 |
| 5,901,315 | * 5/1999 | Edwards et al. | 395/704 |
| 5,956,712 | * 9/1999 | Bennett et al. | 707/8 |

OTHER PUBLICATIONS

Boone, Barry, "Multitasking Java," Java Report, pp. 27–33, May 1996.*

Schmidt, Douglas C., "Systems programming with C++wrappers," C++Report, pp. 50–54, Oct. 1992.*

Berg, Daniel J., "Java Threads—A Whitepaper," Sun Microsystems, pp. 9–58, Mar. 1996.*

* cited by examiner

Primary Examiner—St. John Courtenay, III
(74) Attorney, Agent, or Firm—Leslie A. Van Leevwen

(57) ABSTRACT

The present invention is directed to a system, method, and computer-readable medium for providing a highly efficient locking mechanism for an object's shared data. The locking mechanism is bound to an object during program execution (i.e. during run-time) when synchronization is first requested for the object's shared data. Thus, there are no changes to the actual code, either source code or binary code, which defines the object. A locking mechanism is bound to an object by defining a memory area within the object's header, which either contains the locking mechanism or a pointer to a locking mechanism. The locking mechanism remains bound to the object for the life of the object. Efficiency is gained by limiting the use of operating system semaphores (i.e. kernel semaphores). Operating system semaphores are not used unless blocking (i.e. contention) occurs. Rather, the locking mechanism bound to the object is used during non-blocking situations. Additional efficiency is gained by not assigning or initializing an object's locking mechanism until the first synchronization request is received for the object's shared data. In one embodiment of the present invention, the object's header memory area contains the actual locking mechanism. In another embodiment of the present invention, the object's header memory area contains a pointer or index to a locking mechanism.

30 Claims, 8 Drawing Sheets

SYSTEM AND METHOD FOR ADDING HIGHLY OPTIMIZED SYNCHRONIZATION CAPABILITY TO OBJECTS AT RUN-TIME

FIELD OF THE INVENTION

The present invention relates to information handling systems, and, more particularly, to a system and method for adding highly optimized synchronization capability to objects in an object oriented run-time environment.

BACKGROUND OF THE INVENTION

Java Overview

The number of application programs written in object-oriented languages, such as Java, is growing rapidly in number. One of the key reasons for the popularity of Java is the portability of Java code. A brief overview of Java is given below. Note that specifications for the Java language and the Java Virtual Machine have been released by Sun Microsystems, Inc.

The Java language is an object-oriented programming language. Java programs are compiled to run on a Java Virtual Machine (VM). A Java VM is a computer system which runs on top of the existing hardware and operating system of another computer system. Because the specifications for the Java VM have been published, it is possible to write a Java VM to work with any hardware and/or operating system. Java programs are compiled into bytecode, which will run on any Java VM. The Java VM essentially acts as an interpreter between the Java bytecodes and the system on which the Java program is executing.

There are four major components to a Java VM, all of which are implemented in software. The four components are the registers, the operand stack, the Java heap (sometimes referred to as the garbage-collected heap), and the method area. The method area contains the method code (i.e. the compiled Java code) and symbol tables. The compiled Java code, i.e. the bytecode, consists of a set of instructions. Each instruction consists of a one byte opcode, followed by any needed operands.

Compiled Java programs are typically referred to as Java class files. Many Java class files are downloaded from the Internet for execution on a user's computer system. One of the first steps performed by a Java VM is called verification. A class-file verifier (part of the Java VM) ensures that the file truly is a Java class file and will execute without violating any Java security restrictions.

The class file verifier first checks to determine if the class file being loaded is of the correct class file format. This is done by examining the first four bytes of the class file. All Java class files must begin with the "magic number" (i.e. 0xCAFEBABE). A version number follows the magic number, and the class file verifier checks to ensure that the class file being loaded is compatible with the VM loading it. The verifier also checks the information in the constant pool and other sections of the class file for consistency.

During the linking phase, the verifier ensures that all classes except for the Object class have a superclass, and that all field and method references in the constant pool have valid names, classes, and type descriptors. In addition, the verifier checks the code array of the code attribute for each method to ensure that all local variables contain values of the appropriate type, that methods are called with the appropriate arguments, and that fields are assigned correct values. The verifier also checks the operand stack for correctness.

Finally, during execution, the verifier checks to ensure that a referenced type is allowed for instructions referencing a type. If an instruction modifies a field or calls a method, the verifier checks to ensure that the field or method is available and that the calling method is allowed to access the field or call the method.

Objects are created in Java through the use of the "new" operator. During execution, an object is dynamically created, and memory for the object is allocated on the Java heap. The memory space allocated for an object includes a header area and a data area (for storing the object's data).

The Need For Synchronization

Most programming languages, including most object-oriented programming languages, such as Java, provide the capability to synchronize shared data. Synchronization of shared data allows the language to support multi-threaded applications. The synchronization capability allows a thread to safely reference and update data which may be shared by more than one thread. Synchronization is needed in order to prevent a condition known as a race condition. An example of a race condition is shown below. For illustrative purposes, the example is shown using Java code. However, race conditions can occur in any information handling system, regardless of the programming language or languages used to implement programs in the system.

Assume a program, P1, creates a public object, O1. O1 contains a data element, O1.data1, which is initially set to zero. Further assume that program P1 creates two threads, T1 and T2, each of which has access to object O1. Threads T1 and T2 each include the following logic:

if (O1.data1==0)
{
tmp=O1.data1;
tmp=tmp+10;
O1.data1=tmp;
. . . //do other work
}Without synchronization, T1 and T2 could both attempt to test, and then update, O1.data1 at the same time. This condition is referred to as a race condition, and will lead to unpredictable results when program P1 is executed.

The Use of Monitors for Synchronization

Several techniques have been used, both in hardware and software design, to ensure that race conditions do not occur. Some object-oriented programming languages use a programming language construct, referred to as a monitor, to prevent race conditions. One prior art approach, currently supported in Java, uses a system-wide pool of monitors, which are accessed and released as needed by all objects in the system.

A monitor is logically associated with an object. However, in the prior art, a monitor is not bound to the object. Rather, the monitor encapsulates variables, access procedures, and initialization code within an abstract data type. Threads may only access shared data in an object associated with the monitor via the monitor's access procedures, and only one thread may access the monitor at any one time. A monitor may be thought of as a "wrapper" around an operating system semaphore.

FIG. 1 is a flow chart depicting the use of a system-wide monitor pool to ensure data synchronization. As shown in FIG. 1, when a thread requests access to an object's shared data (step 40), the system-wide monitor pool is locked (step 42). This is done to prevent multiple threads from accessing the same monitor concurrently. A hash algorithm is used to look up one of the monitors from the monitor pool (step 44). The object then acquires, or enters, the monitor (step 46). Part of the logic for entering a monitor is to acquire an operating system semaphore, which is stored as part of the monitor. The system-wide monitor pool is then unlocked (step 48).

The shared data is then acted upon by the thread (step 50). After the thread has finished acting on the shared data, it again locks the system-wide monitor pool (step 52), and uses the same hash algorithm used in step 44 to look up the monitor assigned to the object (step 54). The object then releases, or exits, the monitor (step 56). Part of the logic for exiting a monitor is to release the operating system semaphore stored as part of the monitor. Finally, the system-wide monitor pool is unlocked (step 58).

While the use of monitors prevents race conditions from occurring, this approach can significantly degrade the performance of the information handling system. The use of monitors is a time-consuming process. Every time a monitor is needed by an object, the system-wide monitor pool is locked and unlocked (steps 42 and 48). When an object no longer needs the monitor, the monitor pool is again locked and unlocked (steps 52 and 58). Locking and unlocking the system-wide monitor pool takes a significant amount of time. Further, while the monitor pool is locked, all other threads are prevented from accessing the monitor pool. Any threads requiring shared data synchronization are effectively stopped until the monitor pool is unlocked. This significantly impacts the performance of the system, especially in a multiprocessor environment.

Another problem with the use of monitors is that a monitor is effectively a wrapper around an operating system semaphore. The use of an operating system semaphore requires calls to the operating system, which significantly impacts the performance of the process which is executing. In addition, the monitor structure contains information which is redundant with the operating system semaphore, such as the owning thread and recursion count. Maintaining this information in two data structures is unnecessary and adds additional overhead to the system.

Consequently, it would be desirable to have a system and method for providing shared data synchronization in an object-oriented environment, in a manner which is efficient and uses little system overhead. It would be desirable to eliminate global locks, and to minimize the use of operating system semaphores used to provide synchronization. It would also be desirable if the synchronization capability could be provided for an object in a manner which is "seamless" to the object's definition (i.e. the application programmer does not have to change the definition of an object to incorporate the synchronization method). It would further be desirable to provide data synchronization at run-time, so that existing code does not have to be re-compiled.

SUMMARY OF THE INVENTION

Accordingly, the present invention is directed to a system, method, and computer-readable medium for providing a highly efficient locking mechanism for an object's shared data. The locking mechanism is bound to an object during program execution (i.e. during run-time) when synchronization is first requested for the object. Thus, there are no changes to the actual code, either source code or binary code, which defines the object. A locking mechanism is bound to an object by defining a memory area within the object's header, which either contains the locking mechanism or a pointer to a locking mechanism. The locking mechanism remains bound to the object for the life of the object.

Efficiency is gained by limiting the use of operating system semaphores (i.e. kernel semaphores). Operating system semaphores are not used unless blocking (i.e. contention) occurs. Rather, the locking mechanism bound to the object is used during non-blocking situations. Additional efficiency is gained by not assigning or initializing an object's locking mechanism until the first synchronization request is received for the object. Many objects never require synchronization (e.g., arrays). Thus, these objects are not needlessly bound to a locking mechanism.

In one embodiment of the present invention, the object's header memory area contains the actual locking mechanism. In another embodiment of the present invention, the object's header memory area contains a pointer or index to a locking mechanism. Depending on the actual implementation, there may or may not be a need to allocate additional header memory area when an object is created. The first time that a synchronization request is received for an object's shared data, a locking mechanism is bound to the object and initialized. This locking mechanism is then used to control all future synchronization requests for the object's shared data.

One advantage of the present invention is that synchronization is provided for shared object data in a manner which is highly efficient and uses little system overhead. Another advantage of the present invention is that synchronization is provided at run-time, in a manner which is "seamless" to the object's definition, and thus there is no need to re-compile existing code.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 2:
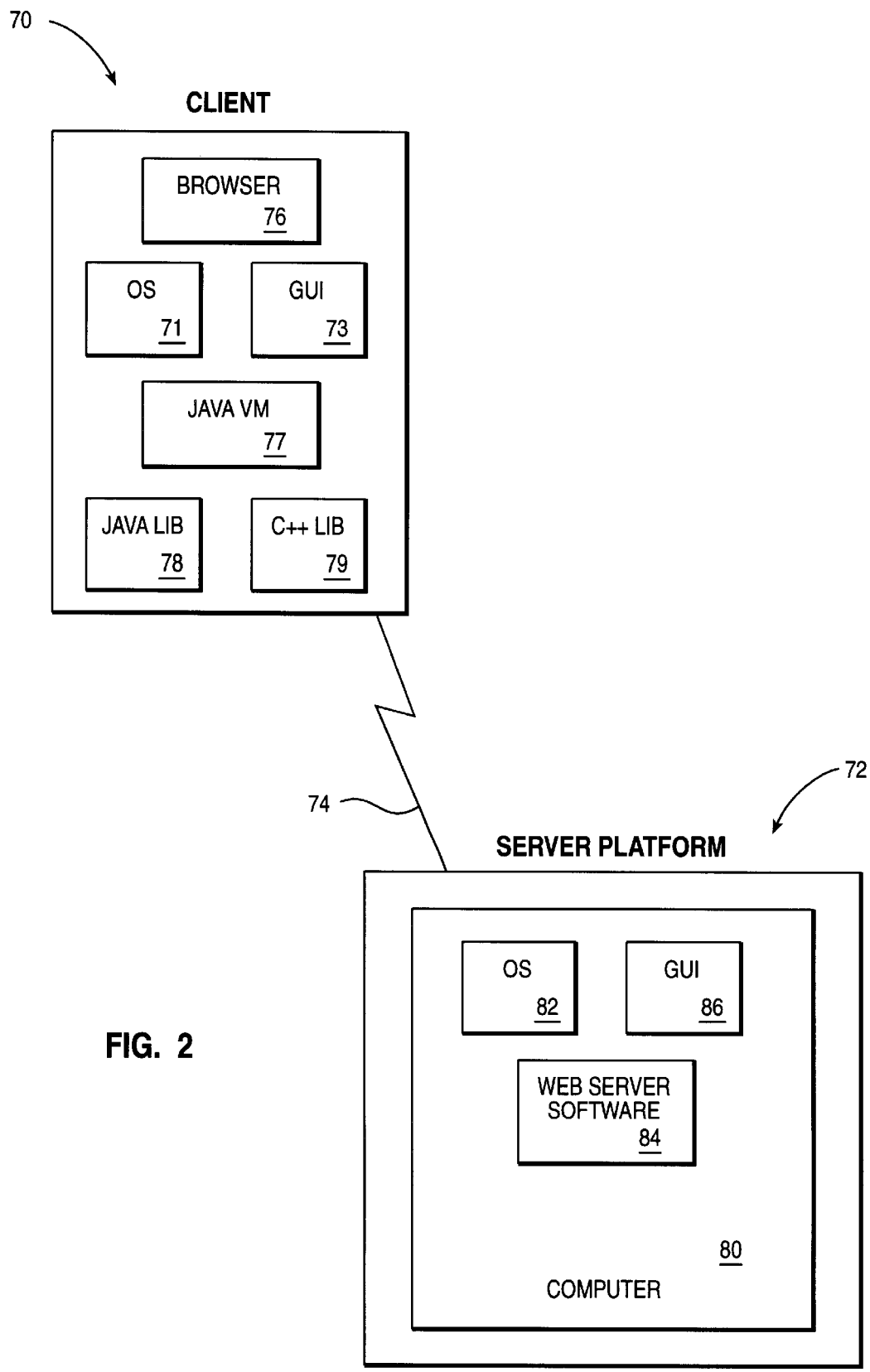
FIG. 2 is a block diagram of an information handling system on which the synchronization method of the present invention may be implemented.

The invention may be implemented on a variety of hardware platforms, including personal computers, workstations, mini-computers, and mainframe computers. Many of the steps of the method of the present invention may be advantageously implemented on parallel processors of various types. Referring now to FIG. 2, a typical configuration of an information handling system that may be used to practice the novel method of the present invention will be described. Client machine 70 is connected to server 72 via communication channel 74. For illustrative purposes, channel 74 is the Internet, an intranet or other known network connection. Server 72 is one of a plurality of servers which are accessible by clients, one such client being illustrated by machine 70. A representative client machine includes operating system 71, graphical user interface 73, and browser 76. A browser is a known software tool used to access the servers of a network, such as the Internet. Representative browsers include, among others, Netscape Navigator, Microsoft Internet Explorer or the like, each of which are "off-the-shelf" or downloadable software programs. Client 70 further includes Java Virtual Machine (VM) 77 for executing Java applets and application programs downloaded from server platform 72. Client 70 also includes Java run-time libraries 78, and C++ run-time libraries 79, which enable client 70 to execute Java and C++ programs. While the present invention is described with reference to Java and C++ programs, the present invention is useful in any multi-threaded, object-oriented environment, and is not limited to Java and C++ environments.

Server 72 supports files in the form of documents, objects, and programs (e.g., applets or application programs). In the Internet paradigm, a network path to a server is identified by a Uniform Resource Locator (URL). The World Wide Web is the Internet's multimedia information retrieval system. In particular, it is a collection of servers on the Internet that use the Hypertext Transfer Protocol (HTTP), which provides users access to files using Hypertext Markup Language (HTML). Users may also download programs from a Web server for execution on their client machines.

A representative server platform 72 comprises an IBM RISC System/6000 computer 80 running the AIX (Advanced Interactive Executive) Operating System 82 and a Web server program 84, such as Netscape Enterprise Server Version 2.0, that supports interface extensions. Server platform 72 also includes a graphical user interface (GUI) 86 for management and administration. The various models of the RISC-based computers are described in many publications of the IBM Corporation, for example, RISC System 6000, 7013 and 7016 POWERstation and POWERserver Hardware Technical Reference, Order No. SA23-2644-00. AIX OS is described in *AIX Operating System Technical Reference*, published by IBM Corporation, First Edition (November 1985), and other publications. While the above platform is useful, any other suitable hardware/operating system/server combinations may be used.

Programs, such as Java programs in bytecode form or compiled C++ programs, may be downloaded via network 74 to client 70 for execution. Alternately, programs may be compiled and executed on client 70, with no server access required. Many types of programs may execute in an information handling system, such as the system depicted in FIG. 2. A multi-threaded program is a program which creates more than one thread of execution. In a multithreaded program, two or more threads may share an object, and may thus need to reference or update the object's data. Synchronization is required to allow multiple threads to safely access and update shared object data.

As discussed above, in the background of the invention section herein, the current practice of using monitors severely impacts the performance of some programs. The present invention is a system and method for providing a highly efficient locking mechanism for an object's shared data. The locking mechanism is bound to an object during program execution (i.e. during run-time) when synchronization is first requested for the object. Thus, there are no changes to the actual code, either source code or binary code, which defines the object. This is useful in today's environment of "portable code." An application programmer may write a C++ or Java program, defining objects as necessary, without being aware of the locking mechanism. The compiled C++ or Java code may be stored on a server, and downloaded to a client at a later point in time. While the program is executing in the client, an object is automatically bound to a locking mechanism when synchronization is first requested on the object.

The locking mechanism of the present invention is efficient, and eliminates several time-consuming steps found in the prior art. A locking mechanism is bound to an object by defining a memory area within the object's header, which either contains the locking mechanism or a pointer to a locking mechanism. Monitors are not used, thus eliminating the need to lock and unlock a system-wide monitor pool. The locking mechanism of the present invention remains bound to the object for the life of the object. This eliminates the problem found in the prior art of having to continually look up, or hash to, a locking mechanism. By binding a locking mechanism to an object, the object itself is locked, rather than being associated with a monitor which must be looked up every time it is needed.

Further efficiency is gained by limiting the use of operating system semaphores (i.e. kernel semaphores) Operating system semaphores are not used unless blocking (i.e. contention) occurs. Rather, the locking mechanism bound to the object is used during non-blocking situations. Additional efficiency is gained by not assigning or initializing an object's locking mechanism until the first synchronization request is received for the object. Many objects never require synchronization (e.g., arrays). Thus, these objects are not needlessly bound to a locking mechanism.

The locking mechanism of the present invention is bound to an object when synchronization is first requested. For example, an object is created in Java by the use of the new() operator. Memory for a new object's header and data is allocated on the heap. Note that memory for the new object's methods is allocated in the method area. In the described embodiment, a memory area within the object header is used to implement a locking mechanism. In one embodiment of the present invention, the memory area contains the actual locking mechanism. In another embodiment of the present invention, the memory area contains a pointer or index to a locking mechanism.

Depending on the actual implementation, there may or may not be a need to allocate additional header memory area when an object is created. For Java objects, if the embodiment utilizing a locking address is used, no additional memory needs to be allocated in the header when the object is created. However, depending on the programming language and run-time environment, it may be necessary to allocate additional header memory in which to store the locking mechanism or pointer or index to the locking mechanism. If it is determined, for a particular implementation, that additional memory needs to be allocated at object creation time, those skilled in the art will appreciate that there are several known methods for allocating memory at run-time.

The actual locking mechanism is preferably not assigned or initialized until synchronization is actually needed on the object. Thus, no initialization is required at object creation time. An object is created, and during program execution, if and when synchronization is required, the locking mechanism is then assigned to the object and initialized.

Figure 3:
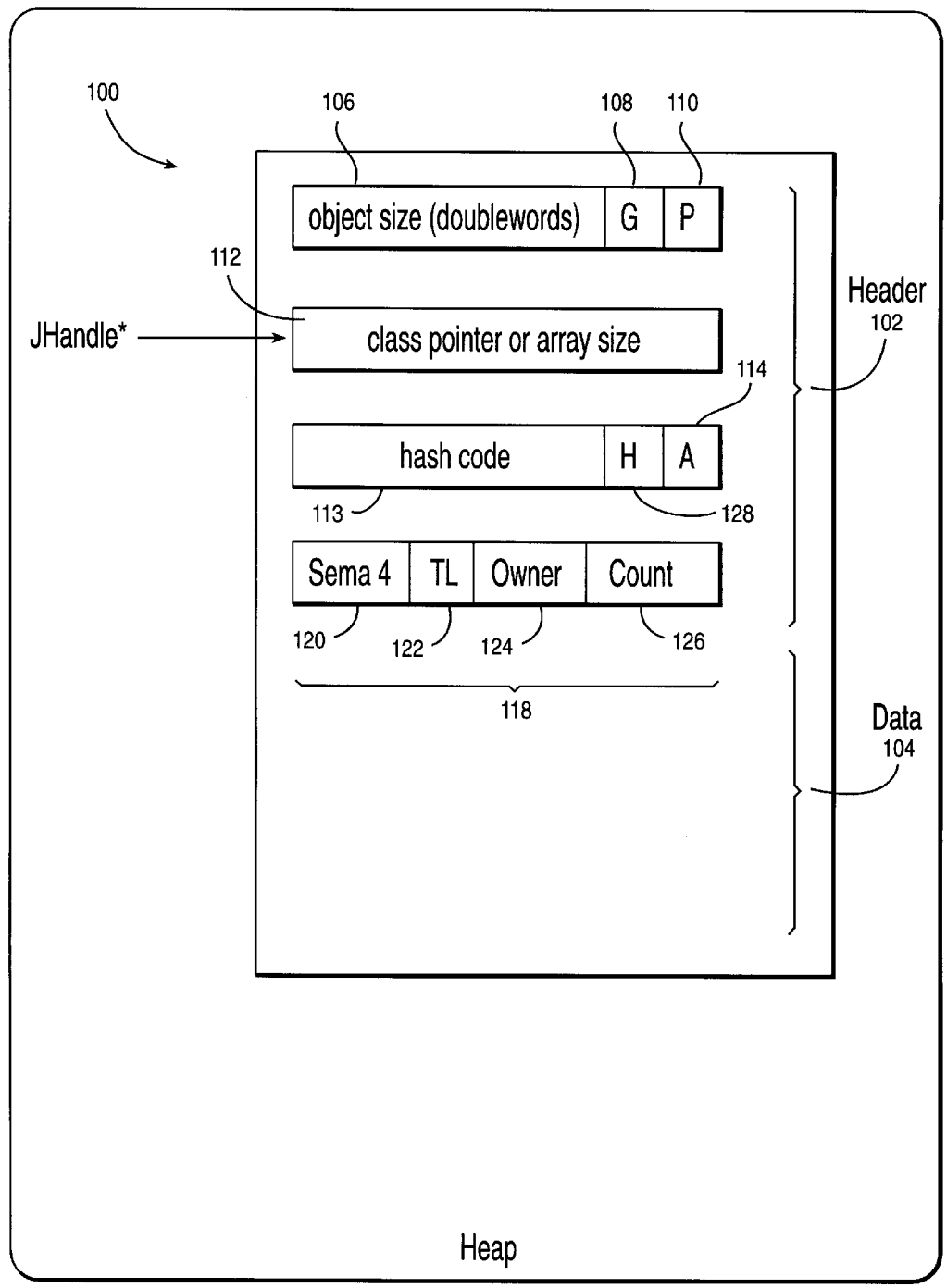
FIG. 3 is a block diagram of an object layout on the heap, according to one embodiment of the present invention.
Figure 4:
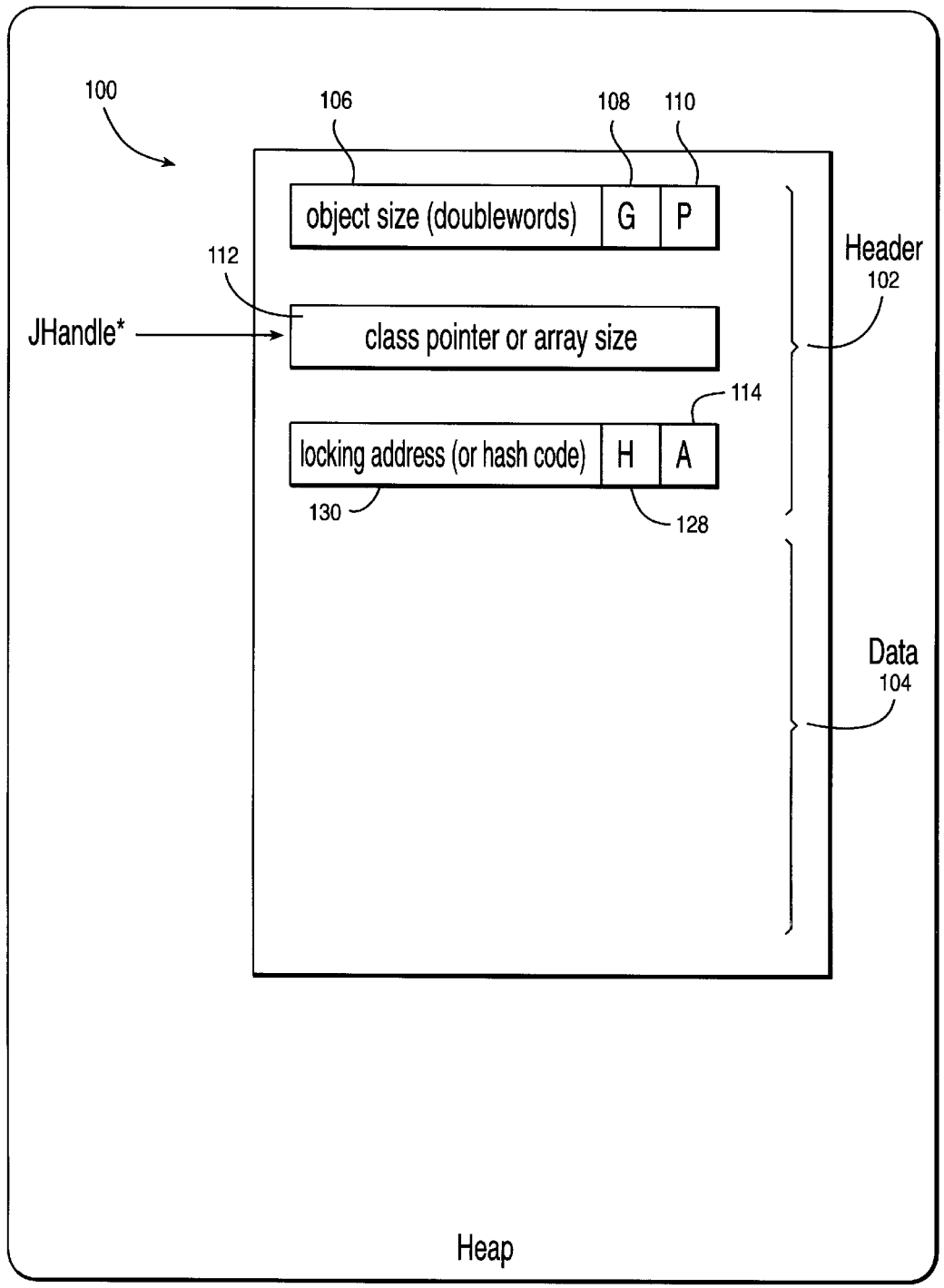
FIG. 4 is a block diagram of an object layout on the heap, according to another embodiment of the present invention.

FIGS. 3 and 4 are block diagrams illustrating two possible object layouts according to the present invention. Referring now to FIG. 3, an object, including a locking mechanism, will now be described. Object 100 includes a header area 102 and a data area 104. Header area 102 contains object size 106, garbage collection bits 108, and pinned bit 110. Header area 102 also includes class area 112 which contains either a pointer to the class information for the object or the array size of the object if the object is an array object. Bit "A" 114 is set to indicate that the object is an array object. Note that Jhandle* (the object handle) points to class area 112. Header area 102 contains the object's hash code 113, which is set when the object is created. Header area 102 also contains locking mechanism 118. In the embodiment depicted in FIG. 3, locking mechanism 118 is defined as follows:

Sema4 (120): Semaphore ID field, which contains the operating system ID of an operating system semaphore associated with this object. Set to null if no operating system semaphore is associated with this object. Note that this field is only used if contention (i.e. blocking) occurs, as this is the only situation where an operating system semaphore is used.

TL (122): TakeLock field, which is set to zero when an object is first locked. TakeLock is incremented when a new thread requests a lock on an object, and decremented when a thread unlocks an object. If TakeLock is equal to –1, it indicates that the lock is not currently taken.

Owner (124): Owner field, which indicates the current thread working with the locked data. Set to null if no thread has locked the object's data.

Count (126): Recursion count of thread currently working with locked data. This field is needed because a thread that has a lock on an object can re-acquire the lock without releasing the "outer" lock.

H (128): Cleared to zero if locking mechanism has been initialized. Set to one if locking mechanism has not been initialized.

Referring now to FIG. 4, another possible object layout will be described. FIG. 4 includes many of the same components as FIG. 3. However, the locking mechanism is not stored directly in header area 102. Instead, header area 102 includes locking address 130 (i.e. a pointer or index) which points to a locking mechanism stored outside of the object. As will be described below, with reference to FIG. 7, the memory area used for locking address 130 is initially used for the hash code of the object. If and when a request for synchronization is received, the hash code will be stored in another memory area, and locking address 130 will be stored in the object's header.

The layout in FIG. 4 is useful when there is a limited amount of memory space within the object header. Locking address 130 may be implemented as a full address or as an index into a table. The locking mechanism pointed to by locking address 130 is similar to the locking mechanism described above, with reference to FIG. 3. Those skilled in the art will appreciate that the locking mechanism pointed to by locking address 130 may be stored in any of a number of ways, including, but not limited to an array, table, or linked list. The decision as to whether the locking mechanism is stored directly in the object header (as shown in FIG. 3) or is pointed to by the object header (as shown in FIG. 4) is made based on the amount of memory space available for use in the object header.

Figure 5:
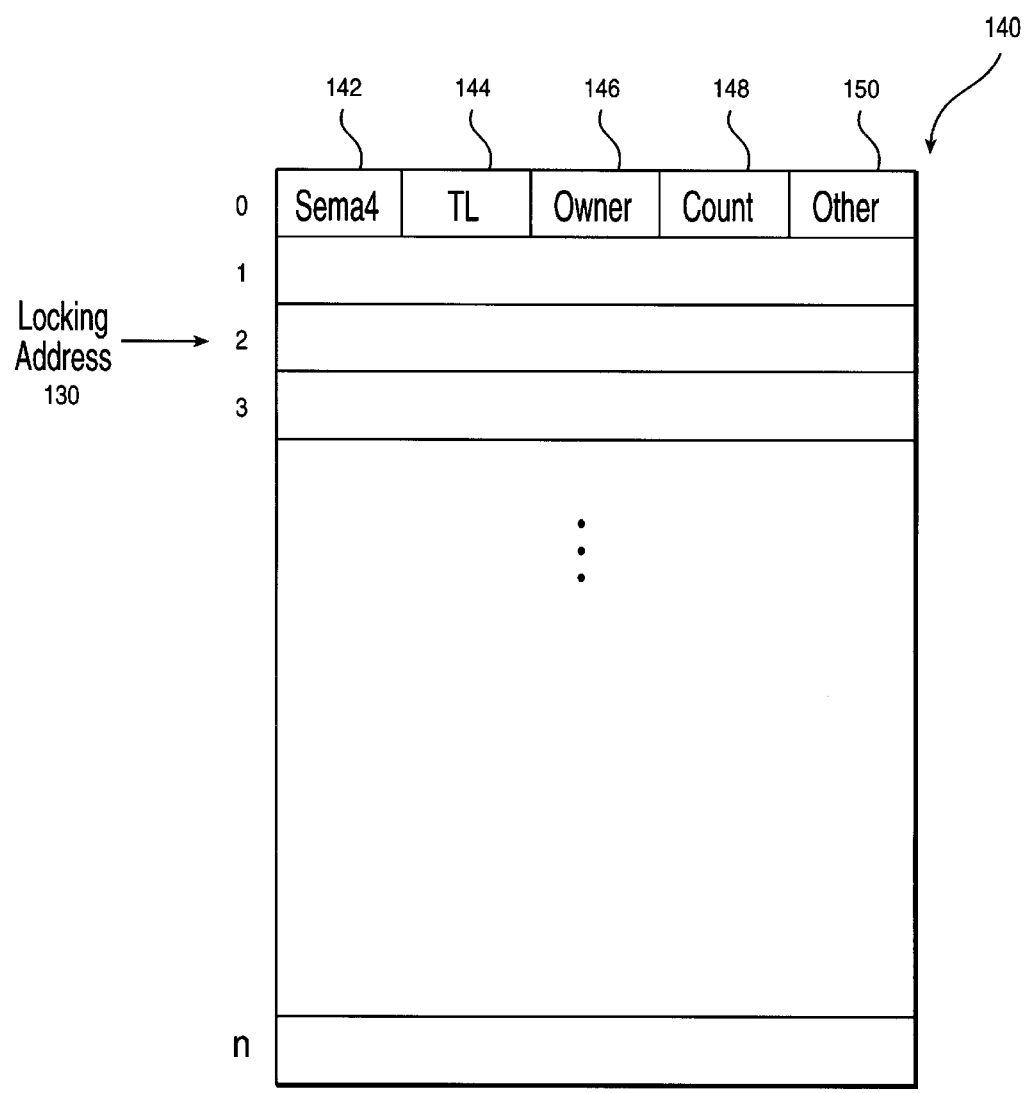
FIG. 5 is a block diagram of a table of locking mechanisms.

FIG. 5 is a block diagram depicting a table of locking mechanisms. Table 140 is one possible way in which locking mechanisms may be stored. Table 140 contains "n" locking mechanisms. In the example shown, locking address 130 points to table entry two. Each entry in table 140 contains Sema4 142, TakeLock 144, Owner 146, and Count 148. These fields are defined as described above with reference to FIG. 3. In addition, table 140 contains Other field 150, which may be used as needed to store additional data.

Figure 6:
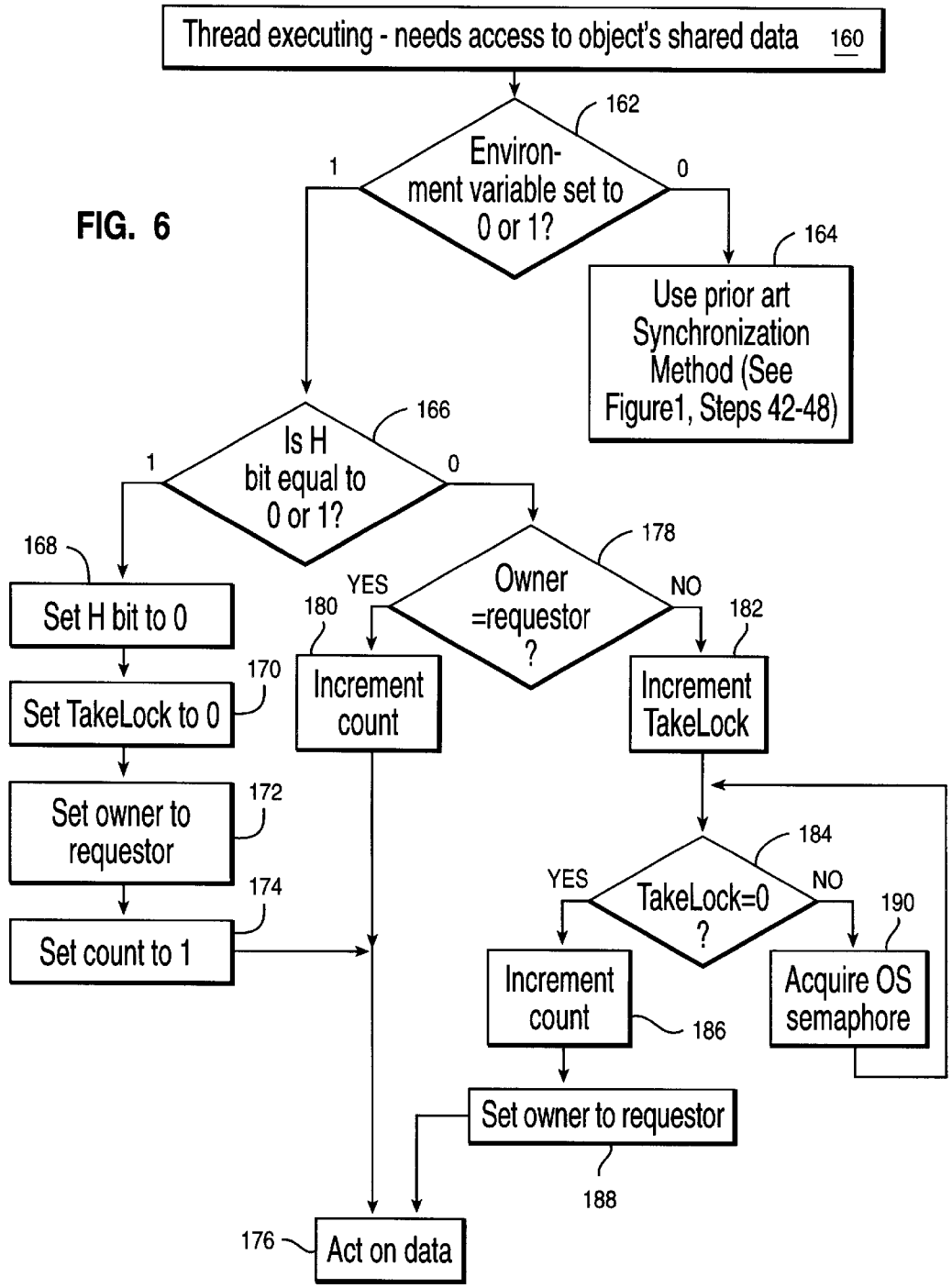
FIG. 6 is a flow chart illustrating a method of accessing shared object data according to one embodiment of the present invention.
Figure 7:
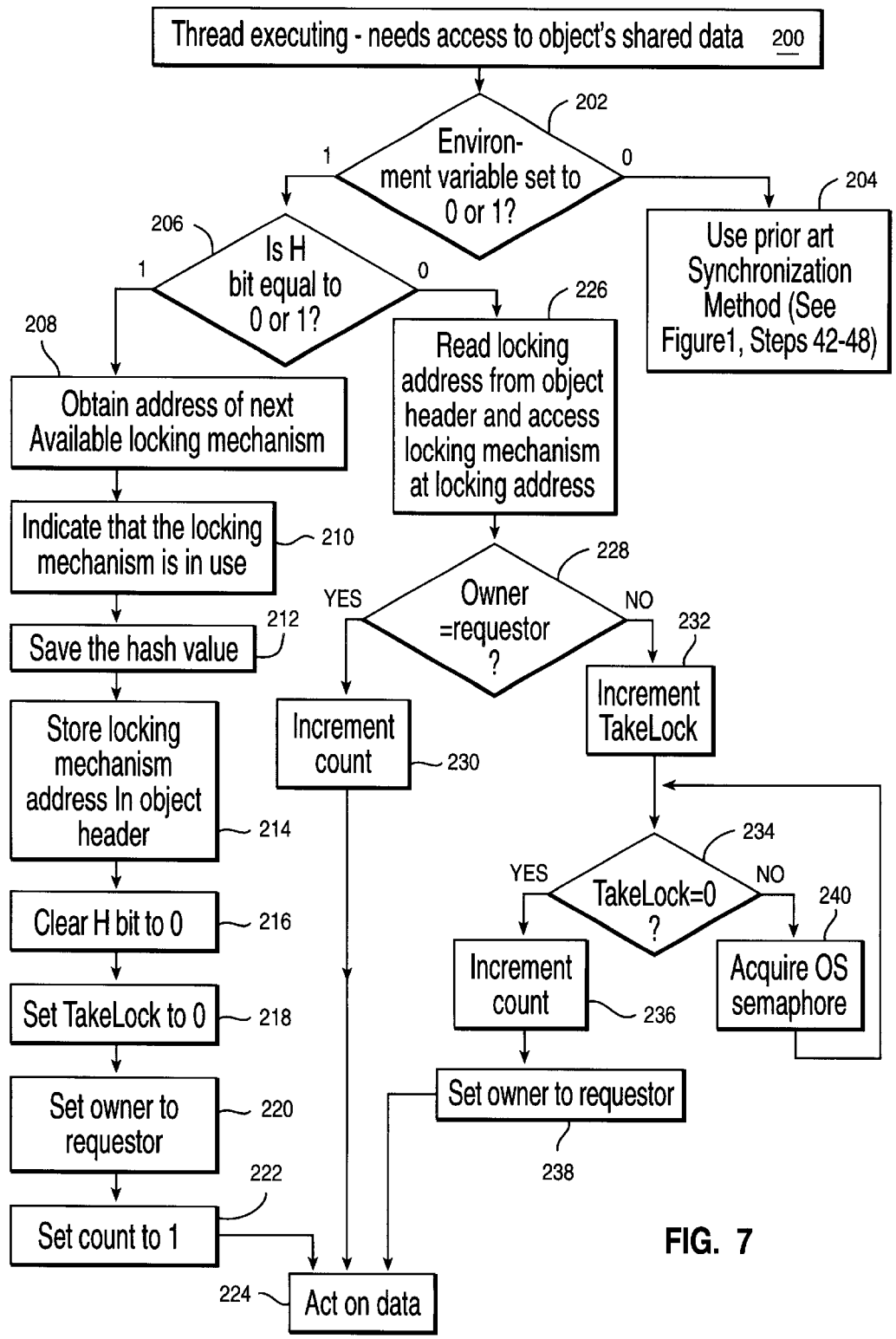
FIG. 7 is a flow chart illustrating a method of accessing shared object data according to another embodiment of the present invention.
Figure 8:
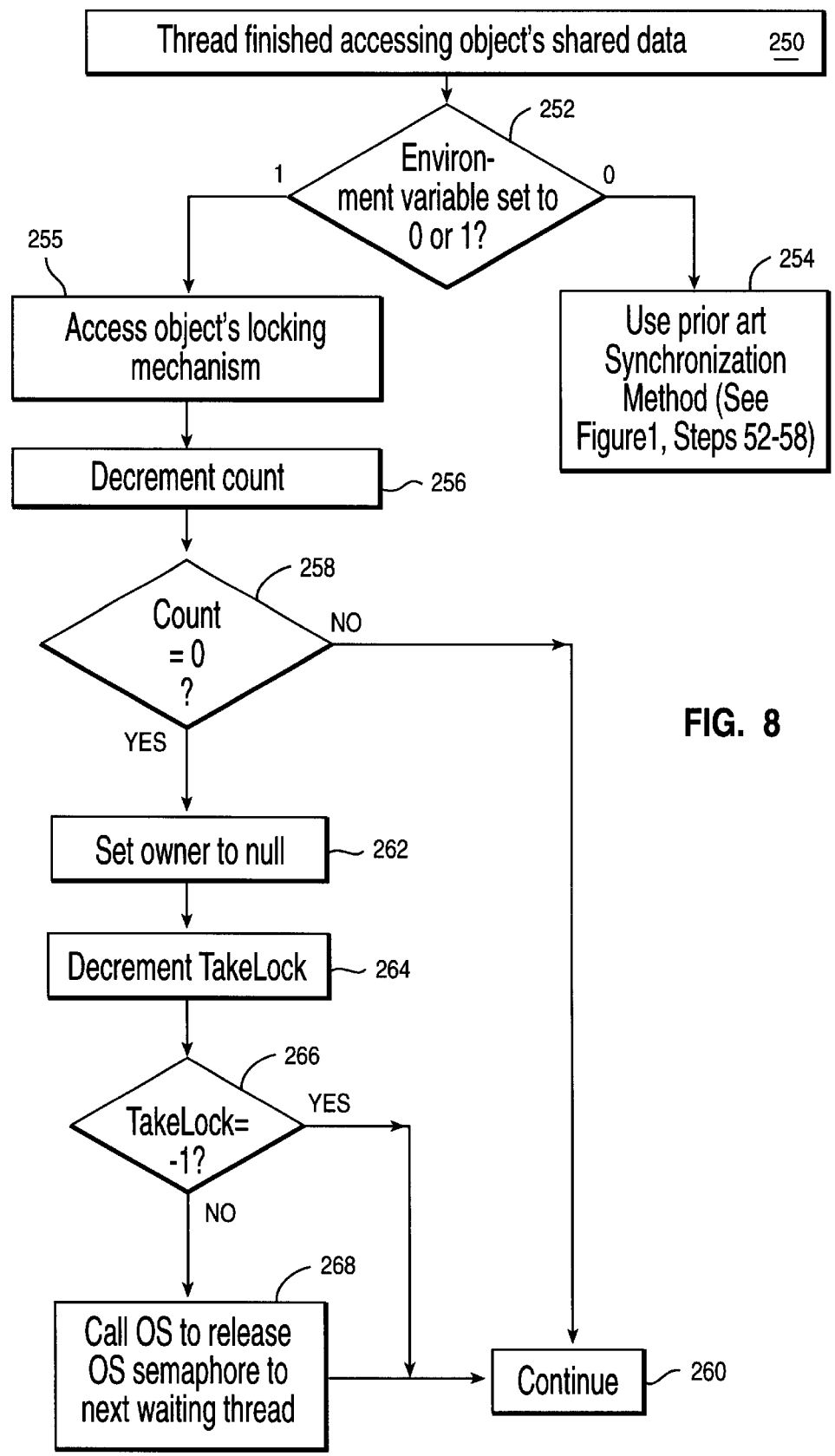
FIG. 8 is a flow chart illustrating a method of unlocking an object's shared data.

FIGS. 6, 7, and 8 are flow charts illustrating methods for working with shared object data according to the present invention. FIG. 6 depicts an embodiment for working with shared data when the locking mechanism is contained within the object's header. FIG. 7 depicts another embodiment for working with shared data when a locking address is contained within the object's header. FIG. 8 depicts a method (for either embodiment) for unlocking the locking mechanism after working with the shared data.

Figure 1:
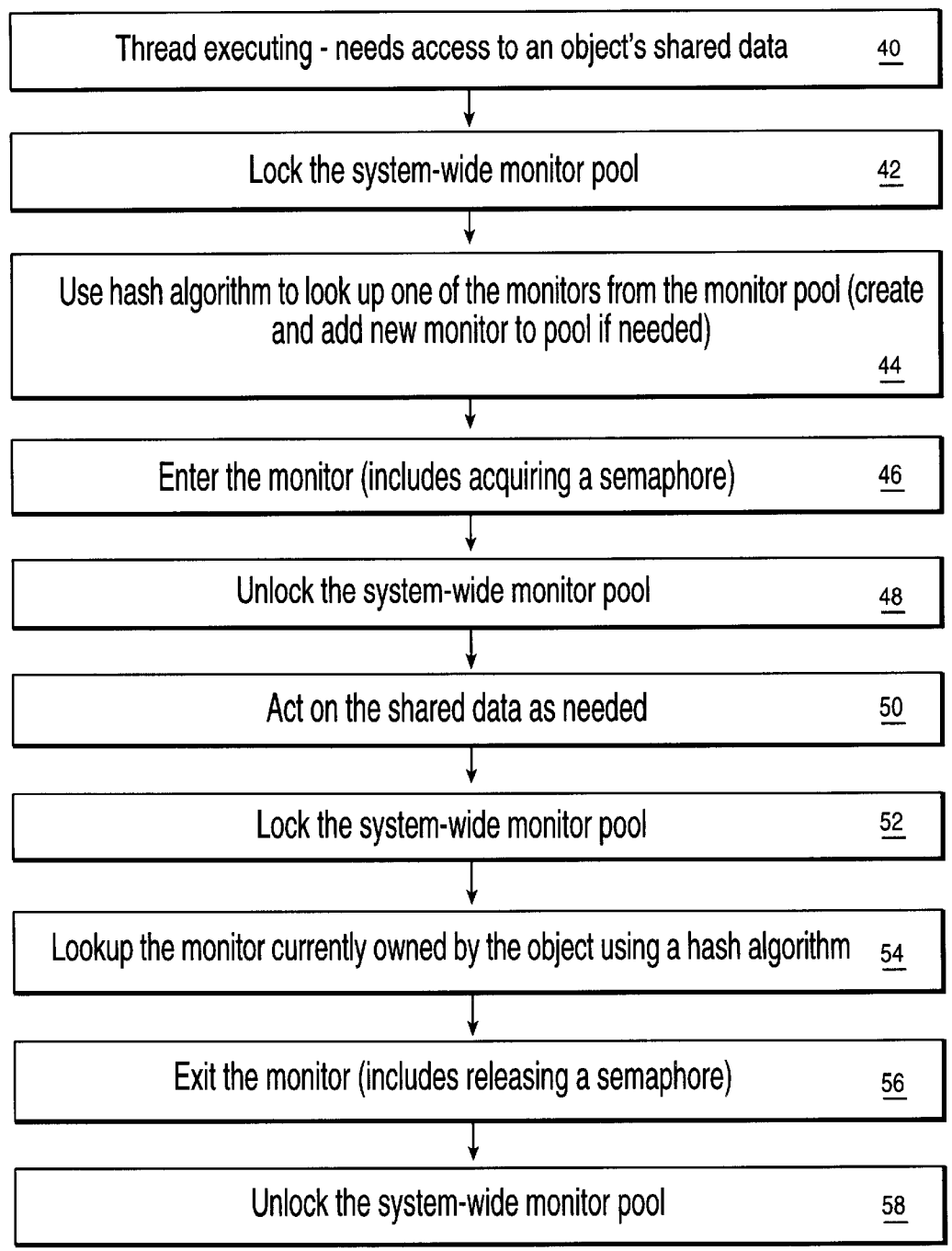
FIG. 1 is a flow chart depicting a prior art use of monitors to provide synchronization.

Referring now to FIG. 6, a method for working with shared data will be described. In the method depicted in FIG. 6, it is assumed that the locking mechanism is contained within the object header, as depicted above with reference to FIG. 3. A thread which is executing (i.e. the requesting thread) requests synchronized access to an object's shared data (step 160). In Java, the use of the "synchronized" keyword indicates that a thread is requesting access to shared data for an object. In the prior art, the use of the "synchronized" keyword would automatically trigger the use of a system-wide monitor (as described in the background of the invention section herein, with reference to FIG. 1). Note that there may be some situations where it is preferable to use the system-wide monitor pool. Thus, the present invention allows the prior art method to continue to be used. An environment variable may be set at process initialization time to indicate whether the prior art method should be used, or whether the method of the present invention should be used. Those skilled in the art will appreciate that other mechanisms may be used to indicate which method is to be used. The environment variable is checked (step 162), and if it is equal to zero, the prior art method is used (step 164).

If the environment variable is set to one, the method of the present invention is used. As discussed above, the locking mechanism is preferably not initialized until it is first used. Thus, the "H" bit is checked (step 166) to determine if it is equal to zero or one. Note that when an object is created, the "H" bit is initially set to one as part of the initialization of the object. If the "H" bit is equal to one, then the locking mechanism for this object has not yet been used. Thus, the locking mechanism needs to be initialized for the object. The "H" bit is set to zero (step 168), and TakeLock is set to zero (step 170) to indicate that a thread has locked the object. The owner field is set to the thread ID of the requester thread (step 172), and the count field is set to one (step 174). The thread may then access the object's shared data (step 176).

If the "H" bit is set to zero (in step 162), then the locking mechanism for this object has previously been initialized and used. Thus, the owner field is checked to see if the owner of the lock is equal to the current requester (step 178). In the case of a recursive thread, the thread currently requesting access to the shared data may also be the thread that is currently accessing the data. If so, the count field is incremented (step 180), and the thread may continue to access the object's data (step 176). If the current owner is not the current requestor, then either another thread is currently accessing the shared data, or no thread is accessing the shared data. The TakeLock field is incremented (step 182), and checked to see if it is equal to zero (step 184). If TakeLock is equal to zero, no other thread currently has a lock on the object. Thus, the count field is incremented (step 186), and the owner field is set to the thread ID of the requesting thread (step 188). The requesting thread now has access to the object's shared data, and may access the data (step 176). If the TakeLock field is not equal to zero, a blocking situation has occurred, and the requesting thread must use an operating system semaphore to wait (step 190). Note that it is preferred that the only time an operating system semaphore is used is when this type of blocking situation occurs.

Referring now to FIG. 7, a method for accessing shared data when an address, or index, to a locking mechanism is contained in the object header will now be described (note that the block diagram of this embodiment is depicted in FIGS. 4 and 5). A thread which is executing (i.e. the requesting thread) requests synchronized access to an object's shared data (step 200). As discussed above, with reference to FIG. 6, an environment variable is checked (step 202). If the environment variable is set to zero, the prior art synchronization method is used (step 204). If the environment variable is set to one, the method of the present invention is used. The "H" bit is checked to determine if the locking address has been initialized (step 206). If the "H" bit is equal to one, there is not yet a locking mechanism assigned to this object. The address of the next available locking mechanism is determined (step 208). Those skilled in the art will appreciate that the next available locking mechanism may be the next entry in a table, array, or linked list.

It is preferable to indicate that the locking mechanism just acquired is now in use (step 210). For example, in the table depicted in FIG. 5, the Other field 150 may be used to indicate whether a table entry is used. In the current embodiment, the hash code is saved (also in Other field 150) (step 212). The address of the locking mechanism is stored in the object's header (step 214) in place of the hash code (i.e. the address is stored where the hash code was previously stored). This is done to conserve memory space, so as to not increase the size of the object. The "H" bit is then cleared to zero (step 216). Note than if the object is ever destroyed (e.g., by garbage collection), the "H" bit may be checked. If it is equal to zero, the locking mechanism table entry allocated to the object may be updated to indicate that the table entry is now available for use by another object. This helps minimize the number of locking mechanisms required in the system. For example, in the embodiment depicted in FIG. 5, the Other field 150 can be cleared to indicate that the particular table entry is available for use by another object. TakeLock is then set to zero (step 218), owner is set to requester (step 220), and count is set to one (step 222). Finally, the thread acts on the data (step 224).

If the "H" bit is equal to zero, then a locking mechanism has been bound to the object. Note that once a locking mechanism is bound to an object, it remains assigned to the object for the life of the object. The following steps are similar to those described in FIG. 6. The owner field is checked to see if the owner of the lock is equal to the current requestor (step 228). In the case of a recursive thread, the thread currently requesting access to the shared data may also be the thread that is currently accessing the shared data. If so, the count field is incremented (step 230), and the thread may continue to access the object's shared data (step 224). If the current owner is not the current requester, then either another thread is currently accessing the shared data, or no thread is accessing the shared data. The TakeLock field is incremented (step 232), and checked to see if it is equal to zero (step 234). If TakeLock is equal to zero, no other thread currently has a lock on the object. Thus, the count field is incremented (step 236), and the owner field is set to the thread ID of the requesting thread (step 238). The requesting thread now has access to the object's shared data, and may access the data (step 224). If the TakeLock field is not equal to zero, a blocking situation has occurred, and the requesting thread must use an operating system semaphore to wait (step 240). As stated above, it is preferred that the only time an operating system semaphore is used is when this type of blocking situation occurs.

FIG. 8 is a flow chart depicting a method of releasing the lock on an object after the thread is finished working with an object's shared data. After finishing its data operations (step 250), the thread requests that the object's shared data be unlocked. As discussed above, an environment variable is checked (step 252). If the environment variable is set to zero, the prior art system-wide monitor pool is being used (step 254). If the environment variable is set to one, the method of the present invention is being used for synchronization. The object's locking mechanism is then accessed (step 255). If the locking mechanism is contained in the object's header, as depicted in FIG. 3, the locking mechanism is accessed directly. If a locking address, pointing to a locking mechanism, is stored in the object's header, as depicted in FIG. 4, then the locking mechanism is accessed through the locking address.

In either case, the count field is decremented (step 256). The count field is checked (step 258), and if it is not equal to zero, then this thread is a recursive thread which is still using the shared data. In this case, the thread continues operation (step 260). If the count field is equal to zero (in step 258), then this thread is completely finished working on the object's shared data. In this case, the owner field is set to null (step 262), and TakeLock is decremented (step 264). TakeLock is checked to determine if any other threads are waiting on this object's shared data (step 266). If TakeLock is equal to −1, then no other threads are waiting (step 260). If, however, TakeLock is not equal to −1, then at least one thread is waiting on the object, and an operating system call is made to release the operating semaphore to the next waiting thread (step 268).

Performance tests have been conducted using the embodiment depicted in FIGS. 4, 5, and 7 (i.e. where a locking address is stored in an object's header). Measurements show that, in certain systems, the present invention reduces the number of instructions executed by a factor of more than twenty-five times over the prior art for obtaining and releasing access to objects' shared data. Thus, the system and method of the present invention greatly improves performance.

Although the invention has been described with a certain degree of particularity, it should be recognized that elements thereof may be altered by persons skilled in the art without departing from the spirit and scope of the invention. Although the invention has been described with reference to the Java and C++ programming languages and run-time environments, the present invention may be implemented in any multi-threaded, object-oriented environment. One of the embodiments of the invention can be implemented as sets of instructions resident in the random access memory of one or more computer systems configured generally as described in FIG. 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network, such as an intranet, or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method of synchronizing object data in an object-oriented, run-time environment, comprising the steps of:
   creating an object, wherein the object includes a header area and a data area;
   receiving one or more requests, each from a requester, for synchronized access to the object's data, wherein the object's data is stored in the data area;
   binding a locking mechanism to the object when a first request is received, wherein said binding step includes the step of storing the locking mechanism in the header area of the object; and
   controlling access to the object's data through the bound locking mechanism.

2. A method according to claim 1, wherein said creating step further comprises the step of allocating additional memory in the header area of the object when the object is created, and wherein said storing step comprises the step of storing the locking mechanism in the additional memory.

3. A method according to claim 1, wherein said binding step comprises the steps of:
   selecting a next available locking mechanism from a plurality of locking mechanisms; and
   storing a pointer to the selected locking mechanism in the header area of the object.

4. A method according to claim 1, wherein said controlling step comprises the step of deciding whether to grant access to the object's data to a current requestor.

5. A method according to claim 1, wherein the header area and the data area are stored in a heap memory.

6. A method according to claim 5, wherein said creating step further comprises the step of allocating additional memory in the header area of the object when the object is created, and wherein said storing step comprises the step of storing the pointer to the selected locking mechanism in the additional memory.

7. A method according to claim 4, wherein said deciding step comprises the steps of:
   determining if the object is in a locked state; and
   if the object is not in a locked state, granting the synchronized access to the current requestor.

8. A method according to claim 7, wherein said granting step further comprises the step of setting the object to a locked state.

9. A method according to claim 7, wherein said deciding step further comprises the steps of:
   if the object is in the locked state, determining a lock owner; and
   if the lock owner is equal to the current requester, granting the synchronized access to the current requester.

10. A method according to claim 9, further comprising the steps of:
    if the lock owner is not equal to the current requestor, denying access to the current requestor; and
    if access is denied to the current requester, putting the current requester in a wait state to wait for access to the object.

11. An information handling system, comprising:
    a plurality of objects, each object including a header area and a data area;
    means for requesting synchronized access to a desired object's data;
    means for binding a locking mechanism to the desired object when a first request is received, wherein said means for binding includes means for storing the locking mechanism in the header area of the desired object; and
    means for controlling access to the object's data through the bound locking mechanism.

12. An information handling system according to claim 11, further comprising means for allocating additional memory in the header area of each object when the object is created, and wherein said means for storing comprises means for storing the locking mechanism in the additional memory of the desired object.

13. An information handling system according to claim 11, wherein said means for controlling comprises means for deciding whether to grant access to the desired object's data to a current requester.

14. An information handling system according to claim 11, wherein the header area and the data area are stored in a heap memory.

15. An information handling system according to claim 14, further comprising a plurality of locking mechanisms, and wherein said means for binding comprises:
    means for selecting a next available locking mechanism from the plurality of locking mechanisms; and
    means for storing a pointer to the selected locking mechanism in the header area of the desired object.

16. An information handling system according to claim 13, wherein said means for deciding comprises:
    means for determining if the desired object is in a locked state; and
    means for granting the synchronized access to the current requestor.

17. An information handling system according to claim 15, further comprising means for allocating additional memory in the header area of each object when the object is created, and wherein said means for storing comprises means for storing the pointer to the selected locking mechanism in the additional memory of the desired object.

18. An information handling system according to claim 16, wherein said means for granting further comprises means for setting the desired object to a locked state.

19. An information handling system according to claim 16, wherein said means for deciding further comprises means for determining a lock owner.

20. An information handling system according to claim 19, further comprising:
    means for denying access to the current requester; and
    means for putting the current requestor in a wait state to wait for access to the desired object.

21. A computer readable medium, comprising:
    a plurality of objects, each object including a header area and a data area;
    means for requesting synchronized access to a desired object's data;
    means for binding a locking mechanism to the desired object when a first request is received, wherein said means for binding includes means for storing the locking mechanism in the header area of the desired object; and means for controlling access to the desired object's data through the bound locking mechanism.

22. A computer readable medium according to claim 21, further comprising means for allocating additional memory in the header area of each object when the object is created, and wherein said means for storing comprises means for storing the locking mechanism in the additional memory of the desired object.

23. A computer readable medium according to claim 21, wherein said means for binding comprises:

means for selecting a next available locking mechanism from a plurality of locking mechanisms; and means for storing a pointer to the selected locking mechanism in a header area of the desired object.

24. A computer readable medium according to claim 21, wherein said means for controlling comprises means for deciding whether to grant access to the desired object's data to a current requester.

25. A computer readable medium according to claim 21, wherein the header area and the data area are stored in a heap memory.

26. A computer readable medium according to claim 23, further comprising means for allocating additional memory in the header area of each object when the object is created, and wherein said means for storing comprises means for storing the pointer to the selected locking mechanism in the additional memory of the desired object.

27. A computer readable medium according to claim 24, wherein said means for deciding comprises:

means for determining if the desired object is in a locked state; and means for granting the synchronized access to the current requester.

28. A computer readable medium according to claim 27, wherein said means for granting access further comprises means for setting the desired object to a locked state.

29. A computer readable medium according to claim 27, wherein said means for deciding further comprises means for determining a lock owner.

30. A computer readable medium according to claim 29, further comprising:

means for denying access to the current requestor; and means for putting the current requester in a wait state to wait for access to the object.

* * * * *